May 2, 1961 J. E. TUSCHER 2,982,842
METHOD FOR AUTOMATICALLY EXECUTING CUTTERS AND THE LIKE
SHAPED PARTS OF REVOLUTION THROUGH ELECTRIC EROSION
Filed Jan. 29, 1958 3 Sheets-Sheet 1

INVENTOR
JEAN EDOUARD TUSCHER
BY Irwin S. Thompson
ATTORNEY

INVENTOR
JEAN EDOUARD TUSCHER
BY  Irwin S. Thompson
ATTORNEY

United States Patent Office 2,982,842
Patented May 2, 1961

2,982,842
METHOD FOR AUTOMATICALLY EXECUTING CUTTERS AND THE LIKE SHAPED PARTS OF REVOLUTION THROUGH ELECTRIC EROSION

Jean Edouard Tuscher, 15 Rue Worth, Suresnes, France

Filed Jan. 29, 1958, Ser. No. 711,831

Claims priority, application France Mar. 21, 1957

18 Claims. (Cl. 219—69)

The electric erosion methods provided for the execution of tools or parts made of hardened steel or of metal carbides are more and more used in practice. The principle of such spark-controlled erosion methods resorts always to a generator producing a current of a uniform direction loading a condenser which is then discharged into a circuit constituted by the part to be machined forming the anode and the shaping tool forming the cathode, the sparks of the discharge removing particles of material off the anode. This method has formed the object of numerous patents having for their object the adjustment of the distance between the cathode and the anode.

The machining of shaped cutters made of metal carbides through the conventional means resorting to a diamond type grinder leads to considerable difficulties by reason of the execution, machining and cost price of the grinders, and also of the machining of the outline, the duration of machining which is generally exaggeratedly high and the cost price of the skilled labor required by the nonautomatic character of the procedure.

My invention has for its object a novel method resorting to the principle of electric erosion for the equipment of a relieving machine producing cutters made of hardened steel or of metal carbides.

Said machine provides the advantages of an almost complete automaticity of manufacture, which limits the expense to that of the unskilled labor which serves merely for the mounting and adjusting of the electrodes on the machine, since the formation of the blank and the finishing step are performed automatically, without the intervention of any operator, so that the machine can work without any attendance, the machine stopping automatically at the end of the formation of the blank or of the finishing step and, also, in the case of a failure in the supply of electric erosion current.

The cost price of the shaping tool constituted by an electrode, which may include a plurality of shaped grooves, in order to execute in succession the blank and the finished cutter without any dismantling of the tool, is far less expensive than that of diamond type grinders. The shaping electrode being circular, the shaped grooves therein may be remachined several times through a mere turning on a lathe.

Generally speaking, the favorable distance between the two electrodes is obtained through a shifting of the shaping cathode, with reference to the anode. With a view to obtaining surface conditions which are comparable with those obtained through a fine grinding, the distance between the two electrodes is adjusted automatically through the rotary speed of the anode, the anode and the cathode being given both the shape of surfaces of revolution.

The rough cutter made advantageously of metal carbide is molded, so as to have a size approximating that of the finished part and it includes a number of teeth separated by gaps or slots. It may also include a roughly cut relieved section, so that only the actual outline is to be machined. In order to reduce as much as possible the duration of machining, the speed of rotation of the cutter corresponding to the machining of a tooth is by far lower than that corresponding to the passage of a gap or slot in front of the shaping electrode. This is obtained through the agency of two motors rotating in the same direction and acting in alternation in an automatic manner on the shaft of a relieving machine carrying the part to be machined through a suitable mechanical gearing.

The blank cutter being obtained after one revolution, the machine stops automatically and it is then necessary to exactly center the finishing outline carried by the cathode with reference to the outline of said blank. To obtain this, accurately and without any loss of time, there are provided electronic centering means constituted by a cathode indicator of the EM4 type which translates into signals the obtention of the maximum resistance between the two electrodes, said maximum resistance corresponding to an accurate relative centering of the two outlines.

Further advantages and features of my invention will appear in a reading of the following description, reference being had to the accompanying drawing, wherein.

The construction and operation of the relieving machines utilized for the manufacture of disc cutters cutting tooth by tooth, or milling cutters cutting by generation, are known as well as the functioning of electronic tubes, diodes, triodes and cathodic indicators.

Figure 1:
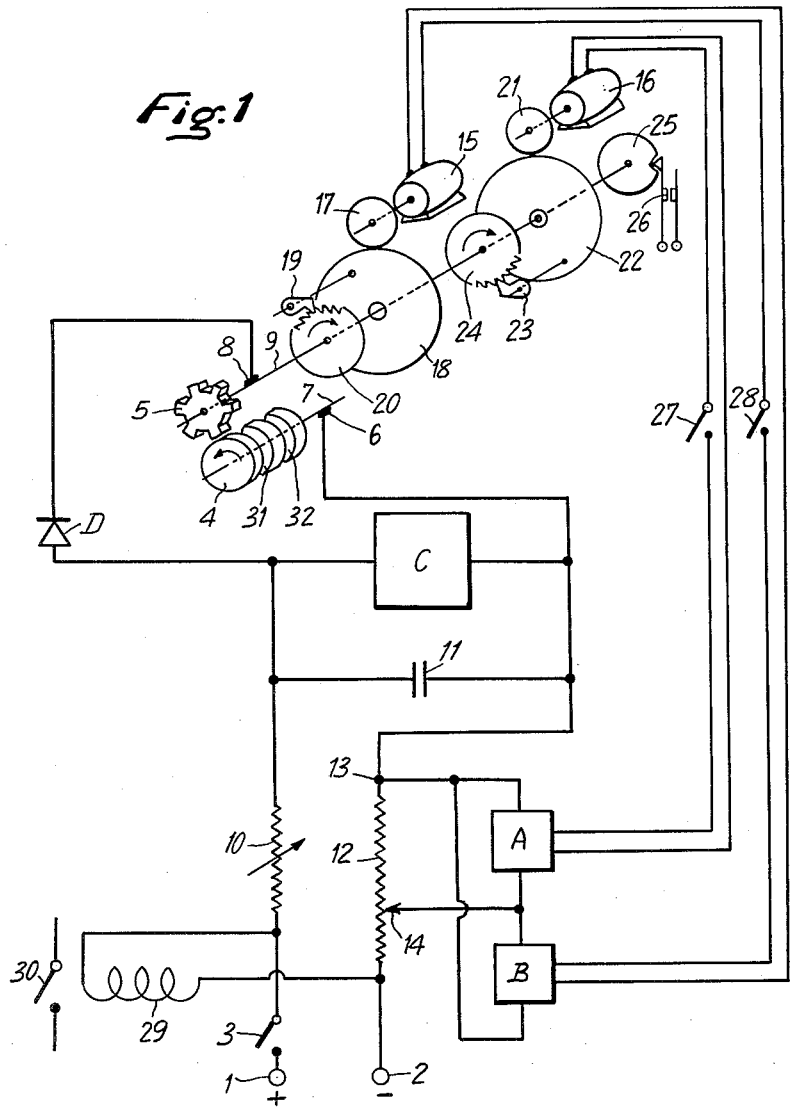
Fig. 1 illustrates diagrammatically a first embodiment of the method for machining shaped cutters through electric erosion.

The voltage provided by the generator of the electric erosion current is fed through the terminals 1 and 2 with the polarity illustrated in Fig. 1.

This generator, not illustrated, is either in the form of a battery or a generator of direct current, or in the form of an alternating current generator feeding a transformer, the secondary of which is connected to a diode or on a rectifier of any known kind.

When the switch 3 is closed, said voltage is applied to the shaping electrode 4 and to the part to be machined, through the agency of the brush 6 rubbing over the shaft 7 carrying the shaping electrode and of the brush 8 rubbing over the work-carrying shaft 9.

The electrode tool 4 is a body of revolution provided with parallel grooves 31, 32 cut in the profile of the cutter; it is mounted on an arbor turning at high speed, fixed on the carriage of a relieving machine (not illustrated).

The anode 5 is fixed on shaft 9 of the operating head of the relieving machine which is alternatively rotated in the same direction by the motor 15 at slow speed and by the motor 16 at high speed, corresponding to the slow machining of teeth and the rapid passage across the slots between teeth. Like in all relieving machines, the movement of part 5 is a rotation in a plane in the case of machining of a disc cutter. In the case of a milling cutter operating by generation, the movement of part 5 is helicoidal, the pitch of the helix being a function of the modulus of the teeth and the diameter of the cutter.

Without modifying the equipment of a relieving machine working by electro-erosion, Fig. 1, the two motors 15 and 16, operating at slow and high speed, can be placed symmetrically in front of the operating head for alternative driving in the same direction, by gearing, a pinion above the shaft 9 of the operating head of the relieving machine. It is obvious that such a disposition of motors 15 and 16, placed symmetrically on each side in front of shaft 9, is less cumbersome but equivalent to that of Fig. 1, which has been illustrated to simplify the illustration.

Said voltage charges through the adjustable loading resistance 10 a condenser 11 which discharges into the circuit of the electrodes 4 and 5, through the rectifier D which allows the passage of only the positive alternations of the oscillating discharge of the condenser 11, with a view to reducing the wear of the cathode 4.

The current charging the condenser 11 passes through a potentiometric resistance 12. Said erosion current produces across the points 13 and 14 of the latter a difference in voltage which is proportional to its intensity.

This difference in voltage $u$ acts on the parts A and B which control the energization and deenergization of the slowly revolving motor 15 and of the high speed motor 16. The slowly rotating motor 15 which serves during the passage of the teeth of the cutter 5 past the outline of the shaping tool 4 drives, through the pinion 17, a free wheel 18 carried by the shaft 9. The free wheel carries a catch 19 rotating with it and driving a ratchet wheel 20 rigid with the shaft 9.

Said motor 15 is controlled by the electric erosion current, in a manner such that the relative distance between the two electrodes is adjusted by the speed of rotation of said motor 15 and furthers the erosion to be provided by sparks, said motor 15 stopping at the end of the machining of each tooth.

The high speed motor 16 is operative during the passage of the interval between any two teeth of the part to be machined 5 past the cooperating electrode 4 and it drives at a high speed through a pinion 21 a free wheel 22 coaxial with the shaft 9. The free wheel 22 carries a catch 23 which rotates therewith and drives in the same direction as the wheel 20 a ratchet wheel 24 rigid with the shaft 9.

Said motor 16 is energized by the same electric erosion current, so that the interruption of the current at the end of the machining of a tooth starts the rotation of said motor 16 and when the end of any slot or gap is reached, the erosion current which appears again when the next tooth is reached stops said motor 16 instantaneously.

The formation of the blank and the finishing of the cutter 5 are obtained each during a single revolution, as a consequence of the control operations referred to and, to a cam 25 which at each revolution of part 5 opens a switch 26, effecting simultaneously the opening of switches 3, 27 and 28 and thus stopping the machine and the functioning of all its parts.

A relay 29 inserted in parallel with the feed circuit acts also on the switches 3, 27 and 28 through the agency of the switch 30, so as to operate upon failure of the generator of the erosion current.

When the outline of the blank has been obtained on the part to be machined, in accordance with the outline 31 of the cathode 4, the machine stops and it is necessary to provide for the centering of the other finishing outline 32 on the shaping tool, with reference to the blank outline obtained on the part 5 to be machined.

The means C for centering the finishing outline 32 with reference to the blank outline obtained on the part 5 are mounted in parallel with the electrode circuit.

Figure 6:
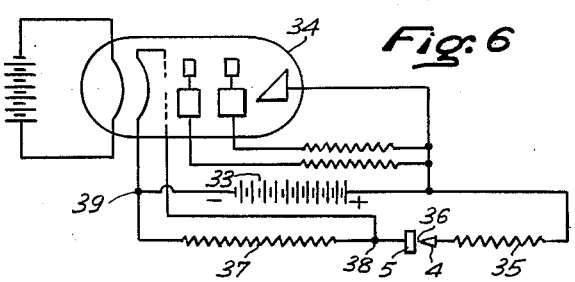
Fig. 6 shows the connection of the electronic indicator serving for centering.

The detail of said means C is illustrated in Fig. 6; a source of direct current voltage 33 feeds, on the one hand, the anodes and the cathode of a cathodic indicator tube 34 of the EM4 type and, on the other hand, the gap 36 between the operative electrodes.

Figure 4:
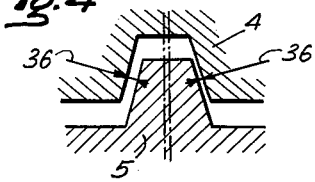
Figs. 4 and 5 show two relative positions of the finishing outline of the cathode with reference to the blank outline of the anode during the centering procedure.
Figure 5:
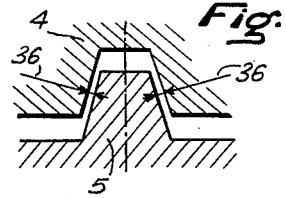

When the electrodes 4 and 5 are out of center, as shown in Fig. 4, the resistance of the dielectric gap 36 is lower than that in the case of Fig. 5 where the two electrodes are shown in perfectly centered relationship.

The high voltage current feeding the resistances 35, 36 and 37 is therefore at a minimum when the two electrodes 4 and 5 are centered and the difference in voltage across the points 38 and 39 of the resistance 37 is also at a minimum. This difference in voltage is introduced between the control grid and the cathode of the tube 34, so that the maximum closing of the shaded sectors over the screen of the tube corresponds to the centering of the electrodes. This centering operation is performed when the machine has stopped, while a switch which is not illustrated allows disconnecting the cathode indicator C from the erosion circuit when operation of the machine is resumed.

The shaping electrode 4 includes two or more shaped grooves 31 and 32 for the execution of the blank and for the finishing of the cutter 5 respectively without any dismantling of the electrode.

This electrode 4 is mounted on a spindle integral with the tool carriage of the relieving machine from which it is electrically insulated. In a plane perpendicular to the relieving movement of the said carriage, it is orientable according to the pitch of the helix of the cutter 5 to be machined. It is driven at a very high speed by a belt and pulley or by a high frequency motor above the spindle (not illustrated).

The high speed of rotation of electrode 4 is necessary for the removal of conductive particles torn off from anode 5 and suspended in a jet of dielectric liquid directed vertically from top to bottom on the electro-erosion space between cutter 5 and tool 4. Experience shows that at a speed of 10,000 r.p.m., the production of the machine is equal to twice that obtained for 1,500 r.p.m. for a higher dielectric value. The surface condition obtained for such a high speed of the cathode 4 is also improved.

Figure 2:
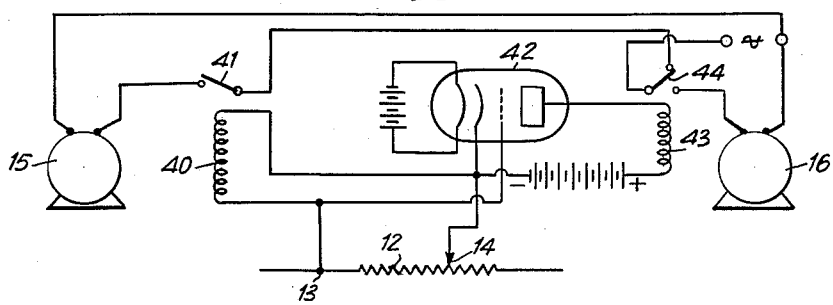
Fig. 2 is a wiring diagram providing selectively through hit and miss the slow rotation machining the teeth of the cutter and the high speed rotation for the slotting between the teeth.

The automatic hit and miss adjustment of the slow motor 15 and of the high speed motor 16, which motors drive both in the same direction the part 5 to be machined is illustrated in Fig. 2. The drop in voltage $u$ produced by the passage of current through the potentiometer 12 of Figs. 1 and 2 acts on the one hand on the relay 40 which controls a switch 41. On the other hand, the same difference in voltage controls a triode tube 42 the output current of which feeds a relay 43 acting on a switch 44. When the spark-producing current passes between the two electrodes 4 and 5, the drop in voltage $u$ is such that the control grid in the tube 42 becomes highly negative, so that the output current of said tube is switched off. The relay 43 does not act on the switch 44 and the circuit feeding the motor 15 is closed both at 44 and at 41.

Under such conditions, when the voltage $u$ across the points 13 and 14 is not sufficient for energizing the relay 40, the contact 41 of said relay is closed and the motor 15 revolves at its normal slow speed. When the voltage $u$ is equal to or higher than that required for actuation of the relay 40, the switch 41 opens and the motor 15 stops.

It is therefore possible, through the mere operation of the slider 14 cooperating with the potentiometric resistance 12, to define the intensity of the spark-producing current and to cut out the possibility of any short circuit.

At the end of the operation on a tooth of the cutter 5, the electric erosion current stops. Since there is no longer any drop in voltage $u$, the grid of the tube 42 assumes its normal voltage, and the output current passing through the relay 43 closes the circuit of the motor 16, while it opens that of the motor 15.

As soon as the gap between two teeth has been travelled over at a high speed by the part 5 to be machined, the electric erosion current appears again for the machining of the beginning of the next tooth and the drop in voltage $u$ biases again in a negative manner the grid of the tube 42, so as to release the switch 44 which closes the circuit of the motor 16 to provide for the machining of said following tooth.

Figure 3:
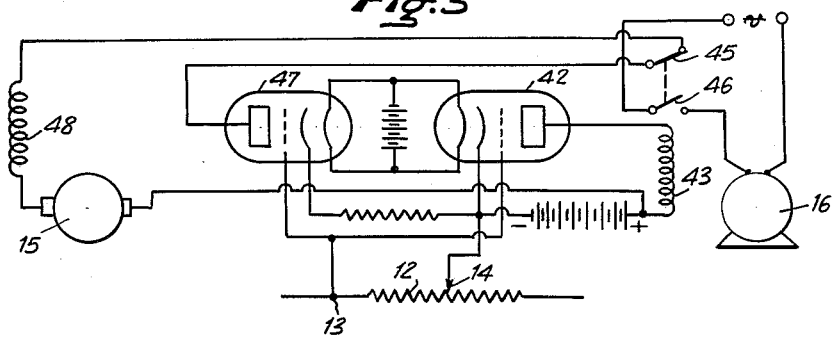
Fig. 3 is a modification of Fig. 2 corresponding to the continuous automatic adjustment of the relative setting of the two electrodes through adjustment of the speed of rotation of the anode.

Fig. 3 illustrates a modification of the continuously operating adjusting means adapted to make the motor 16 revolve at a high speed upon closing of its circuit, as explained with reference to Fig. 1. However, the drop in voltage $u$ appearing during the machining of a tool is such that the double switch 45—46 closes the feed circuit of the motor 15 in series with the tube 47, while it opens the circuit feeding the motor 16. This drop in voltage $u$ acts on the control grid of the triode tube 47 in a manner such that the grid bias may be proportional to the electric erosion current. The output current of said tube is also proportional to the erosion current and passes through the energizing winding 48 of the series motor 15, so that the speed of rotation of the latter is modified with a view to obtaining the desired condition for spark operation.

At the end of the operation on a tooth, the switch 45—46 opens, as disclosed hereinabove, the circuit of the motor 15 and closes that of the motor 16.

To more completely illustrate the invention, Figs. 7 to 10 show the elements of a back-off tool equipped for machining disc cutters by electro-erosion, used for cutting pinions tooth by tooth, and of master cutters cutting gears by generation.

In the machining by electro-erosion of a disc cutter 5 (Figs. 7 and 8), the axis of the headstock broach 9 of the back-off tool bearing the cutter blank 5 is parallel to the axis of broach 7 of the cathode tool 4 mounted on the carriage $a$ of a back-off tool.

During one revolution of the cutter-holder broach 9, the tool carriage $a$ of the back-off tool, guided by a cam cut in an Archimedes screw, advances in the direction of the cutter for each tooth to obtain the back-off of the tooth along angle alpha and rapidly withdraws to its initial position at the end of slot $b$.

This backing-off movement of the carriage $a$, during one revolution of the cutter 5, is produced as many times as the cutter has teeth $c$.

The broach 7 bearing the cathode 4 is fixed to carriage $a$ on the back-off tool. This broach, connected to the negative pole of the generator, is insulated from the machine. It is driven at high speed by an electric motor either directly or by pulley and endless belt.

The cylindrical cathode 4 of conducting material comprises one or more grooves 31—32 cut along the profile of the teeth $c$ of the cutter 5 to be machined.

One complete revolution of the cutter 5 in groove 31 of the cathode 4 roughs out, the backed-off profile $c$ of the teeth of the cutter. This roughing is followed by a finishing which consists in a second complete revolution of the cutter 5 in a groove 32 similar to groove 31 in the cathode 4. Thus the exact geometry and the desired surface condition of the profile of the teeth are obtained.

By means of sets of cams and gears, the back-off machines make it possible to obtain, on demand, the desired angle of offset, alpha, and the oscillating movement of the tool carriage $a$ to each tooth $c$ of cutter 5.

Figure 7:
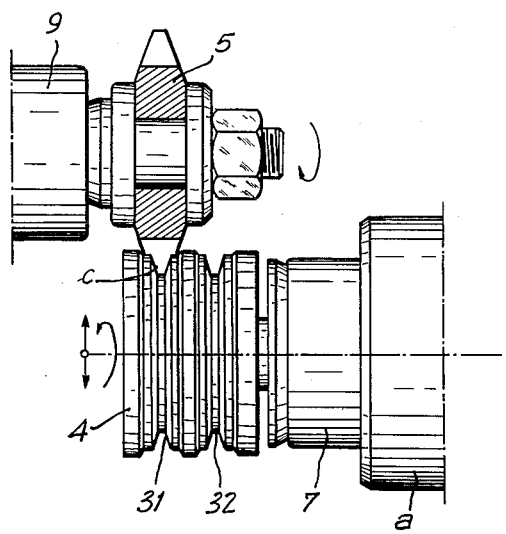
Figs. 7 and 8 show, in overhead and end views, the machining of a disc cutter by the electro-erosion method according to the invention.
Figure 8:
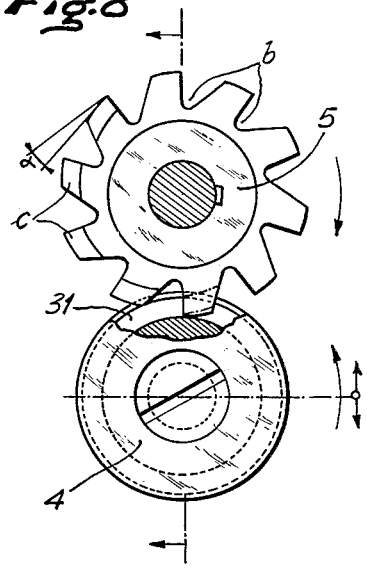

Figs. 7 and 8 show the machining of a disc cutter 5 with 10 teeth in its rough phase, cathode 4 starting the backing-off of the fifth tooth. The form of the teeth $c$ in cutter 5 before and after machining the profile by electro-erosion is clearly indicated.

The process permits obtaining any tooth profile $c$, in a cycloid or in involutes of circles, in common usage, as well as any special profile, for which it is sufficient to make an original tool to cut the circular grooves 31 and 32 in the cathode 4 in the profile desired.

Figure 9:
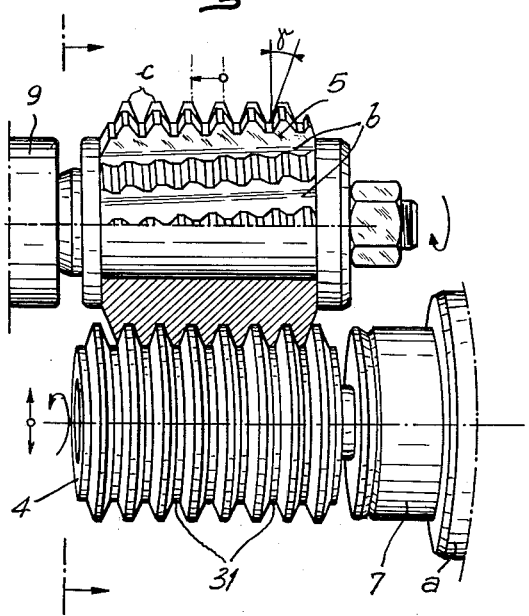
Figs. 9 and 10 are the same overhead and front views of a master cutter machined by the same process.
Figure 10:
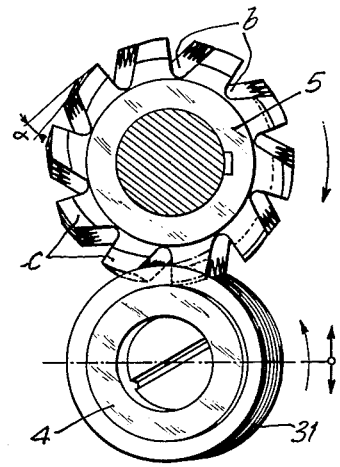

When it is a question of master cutters, cutting by generation, Figs. 9 and 10 show the form and disposition of the anode cutter 5, the cathode tool 4 on the broach and the carriage $a$ of the back-off tool.

Here the master cutter or screw cutter blank 5 is preformed in a helix whose circumferential pitch to the right or left is a function of the modulus M or the diametral pitch DP of the teeth.

Circumferential pitch equals M Pi equals $(25.4/DP)$ (Pi) in mm.

Since the master cutter cuts by generation, the profile of this helix is a trapezoid whose oblique sides form, with the base, an angle equal to the angle of pressure, gamma, of the teeth. The height of the trapezoid is equal to the height of the tooth of the pinion to be cut, or 2.15, or 2.2 M.

The slots $b$ of the cutter are equidistant and perpendicular to the helix of the teeth in such a way that the successive settings do not change the profile of the teeth.

The master cutter blank 5 thus made is quenched or annealed, then its bore and two faces are rectified. It is then mounted on broach 7 and the headstock of the back-off tool.

The cylindrical cathode 4 mounted on the insulated broach 7 of the carriage $a$ of the back-off tool comprises a series of grooves of the same trapezoidal profile, spaced according to the pitch M Pi of the helix of the cutter 5. The number of these grooves 31 is of a unit greater than that of the windings of the helix of the cutter.

The broach 7 is inclined over the back-off tool carriage in such a way that the grooves 31 are oriented along the pitch of the helix of the cutter 5, the axis of the cathode 4 is then parallel to the slots $b$ of each series of teeth $c$ along the said slotting.

The movement of cathode 4 is a rotation at high speed accompanied by an oscillating movement imparting to the teeth of the master cutter a back-off of angle alpha, while the movement of the master cutter 5, instead of being a simple revolution in a plane, is a revolution along its helix.

This movement is therefore a rotation of 360° accompanied by a translation with a value equal to the pitch of the helix (M Pi equals $(25.4/DP) \times Pi$).

When, after a revolution of the cutter 5 with high intensity of electro-erosion current, the rough back-off of the teeth is completed, the broach 7 is returned to its initial position (Fig. 9), the grooves 31 are renewed with the original rack tool that serves to machine them, and a second revolution of the cutter 5 wih low intensity of electro-erosion current is operated to obtain the exact profile and desired surface condition of the backed-off teeth of the cutter.

Thus, as in the case of the disc cutters, a single revolution of the master cutter permits obtaining the rough back-off, while a second revolution insures the exact geometry and the finishing of the surface of the teeth.

The process of electro-erosion replaces the backing-off of the teeth of cutters in the unquenched state and the rectification of profiles of quenched teeth.

It permits the machining of tungsten carbide cutters. In this case, the roughing out of unbacked-off cutters is obtained in pre-annealing by turning, cutting or form grinding (Figs. 7 to 10) as on an unquenched metal, the backing-off of the profile of teeth by electro-erosion being involved only after annealing. This backing-off removes only a few cubic mm. of material from the cutter to obtain the exact profile of the teeth, thus the process is rapid, the wear on the grooves 31 and 32 of the cathode 4 is minimal, and the geometry of the teeth is precise.

The precision of the tooth profiles no longer depends on the skill of the rectifier but only on the exactitude of the original tool used for machining the circular grooves 31, 32 in cathodes 4.

The origins in the form of profiled wheels can be obtained from hard metal with the diamond wheel on a pantographic machine with absolute precision and can be used indefinitely.

The machining of the cutters by electro-erosion is thus automatic and requires no specialized operators.

The method described is obviously applicable to the machining of any part of revolution, particularly in the case of shaped circular tools or the like parts, such as milling cutters of any profile, or simply for the exterior or interior rectification of cylindrical parts. In this latter case cathode tool 4, similarly cylindrical, no longer has grooves 31, 32, and the relieving movement of the tool carriage is stopped. It is obvious that the construction shown in Fig. 1 will be capable of modification for machining by electro-erosion of exterior or interior cylindrical parts.

Of course, the invention has been described and illustrated solely by way of example for the machining of cutters and various detail modifications may be brought thereto without unduly widening the scope of said invention, as defined in the accompanying claims.

What I claim is:

1. A method for the automatic machining of circular shaped parts, chiefly milling cutters, through an electric erosion current relieving the article to be machined forming a positive electrode in registry with a negative electrode consisting in rotating at a high speed the positive electrode, providing for the continuous rotation of the part to be machined alternately at a lower and at a higher speed for machining and idle periods respectively controlling automatically the distance between the two electrodes through the electric erosion current and stopping the rotation of the two electrodes each time a complete operative revolution of the part to be machined is finished and also upon failure of the electric erosion current.

2. A method for the automatic machining of circular shaped parts, chiefly milling cutters, through an electric erosion current relieving the article to be machined forming a positive electrode in registry with a negative electrode consisting in rotating at a high speed the positive electrode, providing for the continuous rotation of the part to be machined alternately at a lower and at a higher speed for machining and idle periods respectively stopping the rotation of the electrodes through the increase of the erosion current beyond a predetermined intensity and stopping the rotation of the two electrodes each time a complete operative revolution of the part to be machined is finished and also upon failure of the electric erosion current.

3. A method for the automatic machining of circular shaped parts, chiefly milling cutters, through an electric erosion current relieving the article to be machined forming a positive electrode in registry with a negative electrode consisting in rotating at a high speed the positive electrode, providing for the continuous rotation, at a higher and lower speed alternately for machining and idle periods respectively, of the part to be machined, providing for the stoppage and starting into rotation of the part to be machined and the change between lower and higher speed of said rotation under control of the intensity of the electric erosion current and stopping the rotation of the two electrodes each time a complete operative revolution of the part to be machined is finished and also upon failure of the electric erosion current.

4. A method for the automatic machining of circular shaped parts, chiefly milling cutters, through an electric erosion current relieving the article to be machined forming a positive electrode in registry with a negative electrode consisting in rotating at a high speed the positive electrode, providing for the continuous rotation of the part to be machined alternately at a lower and at a higher speed for machining and idle periods respectively, providing for adjustment of the speed of rotation of the part to be machined under control of the intensity of the electric erosion current and stopping the rotation of the two electrodes each time a complete operative revolution of the part to be machined is finished and also upon failure of the electric erosion current.

5. A method for the automatic machining of toothed cutters and the like parts through application of an erosion current between said article to be machined forming the positive electrode and a shaping member forming the negative electrode, consisting in rotating at a high speed said negative electrode, providing for the rotation at speeds alternately of the part to be machined to make the higher speed shift the gaps between the teeth to be machined in front of the shaping member and the lower speed shift the teeth of the part to be machined in front of the shaping member, adjusting the lower speed in accordance with the intensity of the electric erosion current and stopping the rotation of the two electrodes each time an operative revolution of the part to be machined is finished.

6. A machine for the automatic machining of circular shaped parts, chiefly milling cutters, through a spark-producing erosion current, comprising two parallel revoluble shafts, one of which is adapted to carry the part to be shaped, a shaping member carried by the second shaft in transverse registry with said part to be shaped and provided with a peripheral groove the cross-section of which corresponds to the desired cross-section of the tooth to be obtained, means for driving alternatingly the part to be machined at two different speeds, a circuit for the electric erosion current adapted to feed a positive voltage to the part to be machined and a negative voltage to the shaping member and means for constraining the teeth of the rough member to be machined to move at the lower speed in registry with the shaping member and for constraining the gaps between said teeth to move at a higher speed in registry with said shaping member.

7. A machine for the automatic machining of circular shaped parts, chiefly milling cutters, through a spark-producing erosion current, comprising two parallel revoluble shafts, one of which is adapted to carry the part to be shaped, a longitudinally shiftable shaping electrode carried by the second shaft and provided at two spaced points of its length with peripheral grooves the outlines of which match respectively the shape of the blank tooth to be first obtained and that of the finished tooth to be obtained on the part to be machined, said outlines being brought selectively by the shifting of the electrode into transverse registry with the part to be machined, means for driving alternatingly the part to be machined at two different speeds, a circuit for the electric erosion current adapted to feed a positive voltage to the part to be machined and a negative voltage to the shaping member and means for constraining the teeth of the rough part to be machined to move at the lower reduced speed in registry with the shaping member and for constraining the gaps between said teeth to move at a higher speed in registry with said shaping member.

8. A machine for the automatic machining of circular shaped parts, chiefly milling cutters, through a spark-producing erosion current, comprising two parallel revoluble shafts, one of which is adapted to carry the part to be shaped, a shaping member carried by the second shaft in transverse registry with said part to be shaped and provided with a peripheral groove the cross-section of which corresponds to the desired cross-section of the tooth to be obtained, means for driving alternatingly the part to be machined at two different speeds, a circuit for the electric erosion current adapted to feed a positive voltage to the part to be machined and a negative voltage to the shaping member, means for constraining the teeth of the rough part to be machined to move at the lower speed in registry with the shaping member and for constraining the gaps between said teeth to move at a higher speed in registry with said shaping member, means for opening the feed circuit each time the shaft carrying the part to be machined has executed a complete revolution and further means through which lack of current in said circuit stops rotation of the shafts.

9. A machine for the automatic machining of circular shaped parts, chiefly milling cutters, through a spark-producing erosion current, comprising two parallel revoluble shafts, one of which is adapted to carry the part to be shaped, a shaping member carried by the second shaft in transverse registry with said part to be shaped and provided with a peripheral groove the cross-section of which corresponds to the desired cross-section of the tooth to be obtained, means for driving alternatingly the part to be machined at two different speeds, a circuit for the electric erosion current adapted to feed a positive voltage to the part to be machined and a negative voltage to the shaping member, a resistance inserted in the circuit, a condenser inserted in said circuit in parallel with the gap between the shaping member and the part to be machined, a rectifier inserted in the circuit between its connection with the condenser and the part to be machined to provide a permanent positive polarity for the latter, a cathode indicator inserted in parallel with the resistance to indicate maximum registry obtained between the shaping member and the part to be machined.

10. A machine for the automatic machining of circular shaped parts, chiefly milling cutters, through a spark-producing erosion current, comprising a shaping electrode provided with at least one peripheral groove registering transversely with the location of the part to be machined and the cross-section of which corresponds to the desired cross-section of the tooth to be machined, two motors adapted to drive selectively in the same forward direction the part to be machined round an axis parallel with the shaping electrode respectively at a higher and at a lower reduced speed, a circuit feeding each motor, a circuit feeding the gap between the part to be shaped forming one electrode and the shaping electrode with direct current flowing towards the part to be machined and away from the shaping member, a potentiometric resistance inserted in last-mentioned circuit, a slider controlling said resistance, a rectifier inserted in said last-mentioned circuit and a condenser mounted in parallel with the part of the last-mentioned circuit including the gap between the part to be machined and the shaping member and the rectifier and means controlled by the current in the potentiometric resistance whereby the beginning and the end of the passage of each tooth of the part to be machined in registry with the shaping member shifts the drive of said part from the higher speed motor to the lower speed motor and reversely.

11. A machine for the automatic machining of circular shaped parts, chiefly milling cutters, through a spark-producing erosion current, comprising a shaping electrode provided with at least one peripheral groove registering transversely with the location of the part to be machined and the cross-section of which corresponds to the desired cross-section of the tooth to be machined, two motors adapted to drive selectively in the same forward direction the part to be machined round an axis parallel with the shaping electrode respectively at a higher and at a lower reduced speed, a circuit feeding each motor, a circuit feeding the gap between the part to be shaped forming one electrode and the shaping electrode with direct current flowing towards the part to be machined and away from the shaping member, a potentiometric resistance inserted in last-mentioned circuit, a slider controlling said resistance, a rectifier inserted in said last-mentioned circuit and a condenser mounted in parallel with the part of the last-mentioned circuit including the gap between the part to be shaped and the shaping member and the rectifier, an electronic amplifier including a cathode, grid and anode, the grid and cathode being connected across the fraction of the potentiometric resistance defined by the slider, a relay fed by the anode circuit and controlling the selective operation of the two motors to energize the lower and higher speed motors for current intensities respectively above and below a predetermined substantially zero value and a second relay inserted in parallel with the grid and cathode circuit and adapted to disconnect the slower motor as soon as the maximum intensity allowed for the erosion current locks the amplifier against operation.

12. A machine for the automatic machining of circular shaped parts, chiefly milling cutters, through a spark-producing erosion current, comprising a shaping electrode, provided with at least one peripheral groove registering transversely with the location of the part to be machined and the cross-section of which corresponds to the desired cross-section of the tooth to be machined, two motors adapted to drive selectively in the same forward direction the part to be machined round an axis parallel with the shaping electrode respectively at a higher and at a lower reduced speed, a circuit feeding each motor, a circuit feeding the gap between the part to be shaped forming one electrode and the shaping electrode with direct current flowing towards the part to be machined and away from the shaping member, a potentiometric resistance inserted in last-mentioned circuit, a slider controlling said resistance, a rectifier inserted in said last-mentioned circuit and a condenser mounted in parallel with the part of the last-mentioned circuit including the gap between the part to be shaped and the shaping member and the rectifier, two amplifiers including each a cathode, grid and anode, means for biasing the grids of both amplifiers through the voltage across the fraction of the potentiometric resistance defined by the slider, a field winding for the slower motor inserted in the anode circuit of one amplifier to be fed with a current proportional to the grid bias, a relay inserted in the anode circuit of the other amplifier and adapted to shift the energization off the higher speed motor onto the slower motor.

13. A machine for the automatic machining of circular shaped parts, chiefly milling cutters, through a spark-producing erosion current, comprising a shaping electrode provided with at least one peripheral groove registering transversely with the location of the part to be machined and the cross-section of which corresponds to the desired cross-section of the tooth to be machined, two motors adapted to drive selectively in the same forward direction the part to be machined round an axis parallel with the shaping electrode respectively at a higher and at a lower reduced speed, a circuit feeding each motor, a circuit feeding the gap between the part to be shaped forming one electrode and the shaping electrode with direct current flowing towards the part to be machined and away from the shaping member, a potentiometric resistance inserted in last-mentioned circuit, a slider controlling said resistance, a rectifier inserted in said last-mentioned circuit and a condenser mounted in parallel with the part of the last-mentioned circuit including the gap between the part to be machined and the shaping member and the rectifier, means controlled by the current in the potentiometric resistance whereby the beginning and the end of the passage of each tooth of the part to be machined in registry with the shaping member shifts the drive of said part from the higher speed motor to the lower speed motor and reversely and means for opening the different circuits at the end of each complete revolution of the part to be machined.

14. In an apparatus for machining of a conductive workpiece by a high frequency electrical discharge, the combination comprising a rotatable shaft carrying an electrode in the form of a tool, a rotatable shaft carrying a conductive workpiece, means for applying high frequency electrical current between said electrode and said workpiece through a dielectric medium interposed therebetween, means for stopping the rotation of said shafts on failure of the high frequency current, and means operably connecting indicating means between the high frequency current leads for determining a predetermined distance between said electrode and said workpiece when the said shafts are stationary.

15. Apparatus according to claim 14 in which the electrode forming the tool is rotated at about 10,000 revolutions per minute.

16. Apparatus according to claim 14 in which the electrode forming the tool is moved to provide a predetermined distance between the workpiece and said tool.

17. Apparatus according to claim 14 wherein the electrode forming the tool is grooved.

18. Apparatus according to claim 14 wherein the means for determining the distance between the tool and the workpiece comprises a cathodic indicator tube.

References Cited in the file of this patent

UNITED STATES PATENTS

| | | |
|---|---|---|
| 2,059,236 | Holslag | Nov. 3, 1936 |
| 2,588,744 | McKechnie | Mar. 11, 1952 |
| 2,650,979 | Teubner | Sept. 1, 1953 |
| 2,778,924 | Hill | Jan. 22, 1957 |

FOREIGN PATENTS

| | | |
|---|---|---|
| 748,544 | Great Britain | May 2, 1956 |